Dec. 24, 1968   R. B. HOWELL   3,417,506
DYNAMIC BALANCING DEVICE
Filed Oct. 20, 1965   3 Sheets-Sheet 1
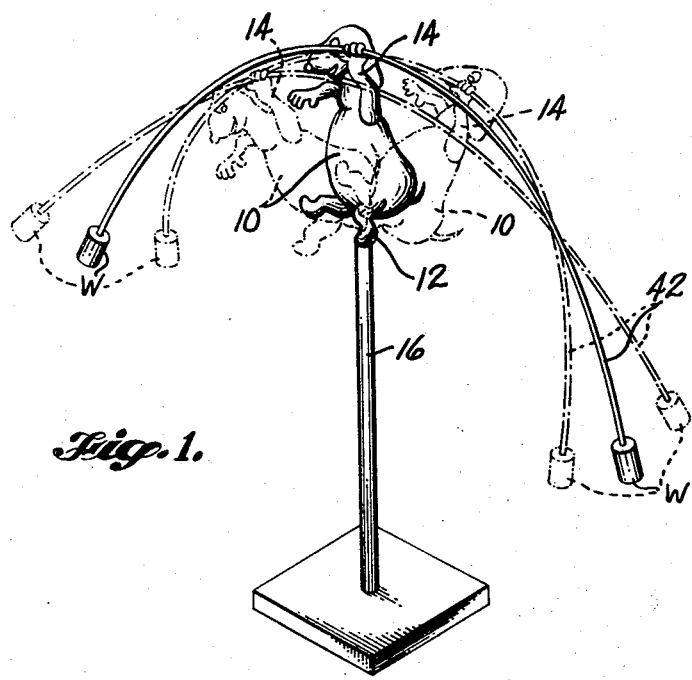
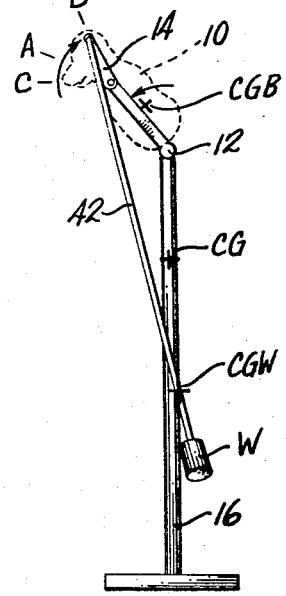
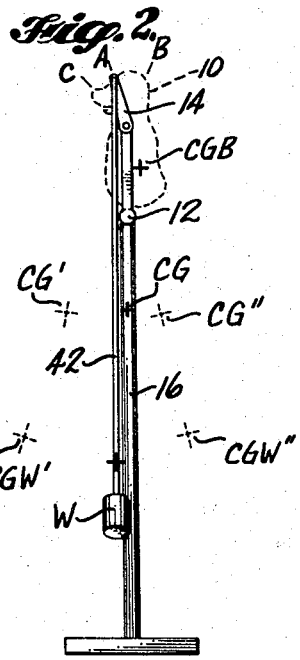
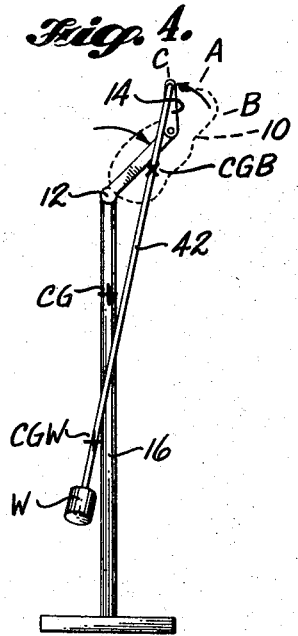
INVENTOR.
ROBERT B. HOWELL
BY Graybeal, Cole & Barnard
ATTORNEYS Dec. 24, 1968    R. B. HOWELL    3,417,506
DYNAMIC BALANCING DEVICE
Filed Oct. 20, 1965    3 Sheets-Sheet 2
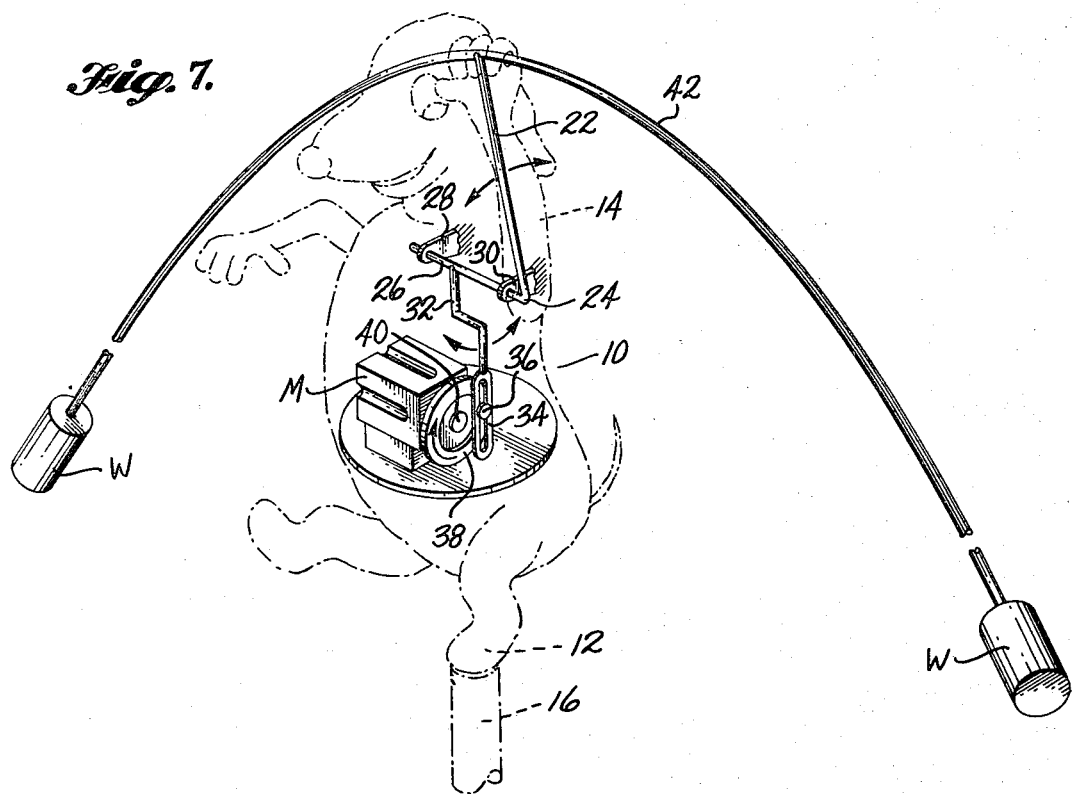
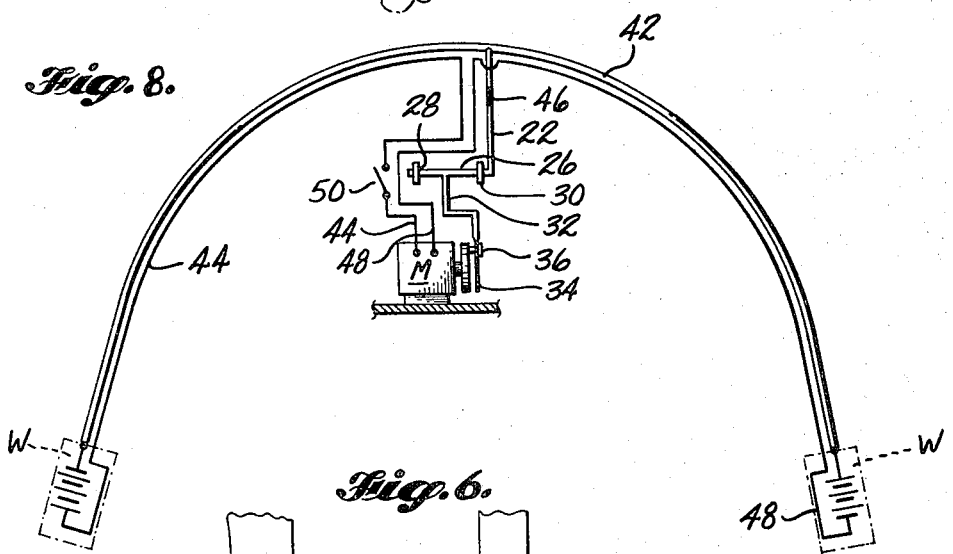
INVENTOR.
ROBERT B. HOWELL
BY Graybeal, Cole & Barnard
ATTORNEYS

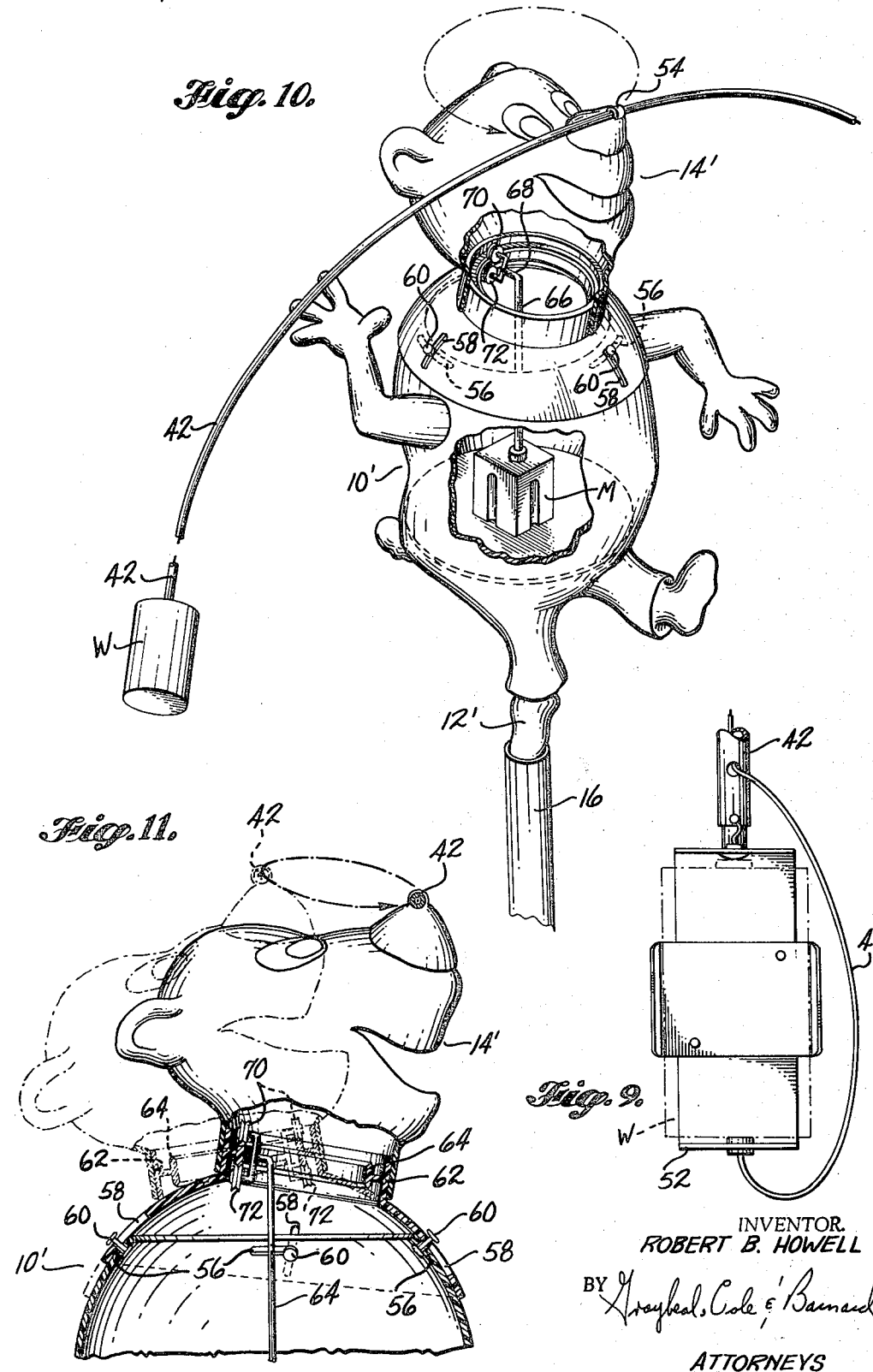

United States Patent Office 3,417,506
Patented Dec. 24, 1968

3,417,506
DYNAMIC BALANCING DEVICE
Robert B. Howell, 2115 Madrona Point Drive,
Bremerton, Wash. 98310
Filed Oct. 20, 1965, Ser. No. 498,631
5 Claims. (Cl. 46—131)

ABSTRACT OF THE DISCLOSURE

An articulated body composed of a lower hollow portion adapted to be balanced on a support, and an upper portion movably connected to the lower portion and carrying an arcuate balancing rod of substantial length and curvature which has a weight affixed to each of its ends. An electric motor is located within the hollow portion of the body and is adapted to move the upper portion of the body relative to the lower portion. Dry cell batteries are used for the weights and electrical conductor means extending through the arcuate rod electrically connect the batteries with the electric motor.

---

The present invention relates to balancing devices of the type having a tipsy base and weight means for counterbalancing the device to a position of balance on said tipsy base. More particularly, it relates to the provision of balancing devices of this type which include motorized drive means for causing movement and changes in attitude of the balancing device while it is balanced.

Some known static balancing devices are disclosed by Goosman U.S. Patent No. 2,551,668; Pearce, Cyril, Toys & Models, New York, B. T. Batsford Ltd., plate 4 and pages 14 and 15; Swezey, Kenneth M., After-Dinner Science, New York; McGraw-Hill Book Company, pages 52–56; Swezey, Kenneth M., Science Magic, New York, McGraw-Hill Book Company, pages 22 and 23. The balancing devices disclosed by this patent and these books each includes a body having a tipsy base and weight means connected to the body and arranged to place the center of gravity of the balancing device below the level of the tipsy base, and to maintain the device balanced. However, all of these devices involve static balancing; they do not include motorized means for causing movement or changes in attitude of the body while it remains balanced.

A principal object of the present invention is to provide a dynamic balancing device comprising a body having a tipsy base, weight means for counterbalancing said body on its tipsy base when placed on a support, and motorized drive means inside said body operable to change the position of the center of gravity of said weight means relative to the location of contact of the tipsy base with its support an amount sufficient to cause a noticeable change in the attitude of said body as the device seeks a new position of equilibrium. Known balancing devices having moving parts are disclosed by Killman U.S. Patent No. 950,536; Allison U.S. Patent No. 1,207,464; Burlin U.S. Patent No. 2,392,721, and Buckey U.S. Patent No. 2,942,-381. Each of the balancing devices disclosed by these patents is adapted to move with or along a wire or string type support. None is adapted to merely change its attitude while remaining balanced at substantially the same location on its support.

Another principal object of the present invention is to provide a dynamic balancing device that comprises a body having a first portion with a tipsy base, a second portion secured to said first portion for movement relative thereto, weight means disposed below said tipsy base and of a magnitude sufficient to put the center of gravity of the entire balancing device below the level of the tipsy base, means connecting said weight means with said second portion, and motorized drive means inside said body operable to move the said second portion relative to the said first portion, and hence the center of gravity of the balancing device relative to the location of contact of the tipsy base with its support, an amount sufficient to cause a noticeable change in the attitude of said body as the device seeks a new position of equilibrium.

In some forms of the invention, the said second portion is pivotally secured to said first portion, and the drive means is operable to swing the second portion back and forth about said pivotal connection and along a substantially fixed path, and the body moves in similar fashion. In other forms of the invention, the second portion of the body is universally connected to the first portion, and the motorized drive means is operable to rotate said second portion and the weight means connected therewith about a substantially fixed orbit, causing an orbital movement of the entire balancing device.

According to the present invention, the body of the balancing device may be a characterization of an animal or human form, with the said second portion being an appendage of the characterization, such as an arm or the head, for example, with the said first portion comprising the remaining part of such characterization. When an animal or human characterization is used, the tipsy base may be an unstable bottom surface of one foot of the characterization.

In some forms of the invention, the weight means comprises a pair of end weights and an arcuate balancing rod interconnected therebetween. A mid portion of the balancing rod is connected to the movable appendage of the balanced body. The motorized drive means for moving the appendage relative to the rest of the body preferably includes an electric motor powered by one or more dry cell batteries. A pair of dry cell batteries may be used for the end weights, and the balancing device may include electrical conductor means incorporated in the connector rod and serving to connect the two dry cell batteries and the electric motor together in series.

Another object of the present invention is to provide a dynamic balancing device of the character described which in use is mystical and somewhat magical, in which the balanced body leans first in one direction and appears to be falling off its support, but stops before actually falling, then returns to an upright position, and then leans in the opposite direction, and in which the motorized drive means for causing such movement is not readily visible, and the movement of the appendage relative to the rest of the body is not readily apparent.

Balancing devices constructed according to the present invention may be used as toys, for amusement purposes, or they may be used as attention attracting portions of advertising displays or the like.

These and other characteristics and features, objects and advantages of the present invention will be apparent from the following description of certain typical embodiments thereof, taken together with the accompanying illustrations wherein like letter designations and like numerals refer to like parts, and wherein:

FIG. 1 is a perspective view of a first embodiment of the invention, involving an animal characterization balanced on one leg, weight means in the form of a pair of end weights interconnected by an arcuate connecting rod the central portion of which is secured to the hand (as if grouped thereby) of a movable arm of the animal, such view including a solid line showing of the characterization in a substantially upright position, and broken lines showing of such characterization in its extreme forward and rearward positions of tilt;

FIGS. 2–4 are diagrammatic views of such embodiment of the invention, with FIG. 2 depicting the generally upright position of the characterization, with FIG. 3 depicting a position of forward tilt thereof, and with FIG. 4 depicting a position of rearward tilt thereof;

FIG. 5 is a side elevational view of a modified form of tipsy base and support therefor, such base having a concave undersurface and said support having a convex upper surface;

FIG. 6 is a view of still another form of tipsy base, adapted for supporting the characterization on a horizontal wire, rod, or the like;

FIG. 7 is a perspective view, on an enlarged scale, of the embodiment of FIG. 1, presenting a solid line showing of the weight means and the internal drive means for moving same, and a broken line showing of the outline of the characterization;

FIG. 8 is a schematic of a typical electrical system for the motorized drive means, involving a pair of batteries which function as both the source of electrical energy and the end weights;

FIG. 9 is a view showing a typical battery holder, and conductor wires leading from its opposite ends and extending into the interior of the connector rod;

FIG. 10 is a perspective view of a modified form of balancing device, adapted for orbital movement; and FIG. 11 is an enlarged scale side elevational view, partly in section, of the upper portion of the animal characterization involved in the balancing device of FIG. 8, showing a typical mechanism for rotating the animal's head and the weight means carried thereby.

Referring more specifically to the drawing, the typical embodiment of the invention illustrated by FIGS. 1–4 and 7 comprises a body 10 having a tipsy base 12 and a movable appendage 14. By way of typical and therefore nonlimitive example, the body 10 is shown in the form of an animal characterization. The tipsy base 12 is a rounded lower surface on one foot of the characterization, and the movable appendage 14 is one of the arms.

Herein the term "tipsy base" is used to mean an unstable base on which the body will not stand by itself, i.e. will not stand unless counterbalanced. In FIGS 1–4, 7 and 10 the tipsy base 12 is shown to be a small area convex surface, and the support 16 therefor is shown to have a concave support surface. Other types of "tipsy bases" include a base (FIG. 5) having a concave lower surface 18 adapting it to set on a convex support surface 19. FIG. 6 shows that if a wire or rod 20 is used as the support, the tipsy base may be provided with a concave peripheral groove 21 adapting the device to sit on the wire or rod 20.

Referring now specifically to FIG. 7, the upper part 22 of a first class lever is incorporated in the appendage 14. Lever part 22 may be in the form of a stiff wire or rod that is sharply bent at 24 and extends inwardly of the body 10 from the base of the apepndage 14 to form a shaft 26. The shaft 26 is shown to be rotatably supported at its ends by a pair of support members 28, 30 which are secured to the body 10 and together serve as a fulcrum for the lever. The lever also includes a lower part 32 which extends downwardly from an intermediate connection with the shaft 26 and terminates in the form of a crank guide 34. As illustrated, the crankpin guide 34 comprises means forming a longitudinal slot in which the shank portion of a crankpin 36 is received. The crankpin 36 is secured to a crank, which may be of the form of a wheel 38, at a point offset from the center of rotation 40 of the crank 38. Preferably, the crank 38 is secured to the output shaft of, and rotated by, a small electric (D.C.) motor M. However, a mechanical wind-up spring motor could be used as well.

As will be evident, as the motor M rotates the crank 38, the crankpin 36 first pushes the lower lever part 32 in one direction and then in the other. This causes the upper lever part 22 and the appendage 14 to move in a similar fashion above the fulcrum means 28, 30.

As mentioned above, the tipsy base 12 is unstable and will not support the body 10 unless such body 10 is counterbalanced into a position of balance on the tipsy base 12. A suitable weight means for effecting such counterbalancing is shown to comprise a pair of end weights W and an arcuate connector rod 42. The connector rod 42 is attached near its middle to the upper end of lever part 22, and on both sides of such point of connection it extends outwardly and curves downwardly.

The weights W are located below the level of the tipsy base 12 and are of a magnitude sufficient to put the center of gravity CG of the entire balancing device below the level of the tipsy base 12. Each weight W counterbalances the other in the plane of the connector rod 42. Thus, the body 10 does not fall sideways off its support surface. The two weights W act together to prevent the body 10 from falling either frontwards or backwards off its support surface. In this respect, reference is made to FIG. 2 wherein the center of gravity of the body 10 is designated CGB, the center of gravity of the weight means is designated CGW, and the center of gravity of the entire device is designate CG. As will be apparent, when the body 10 is set on its support surface and balanced statically, the center of gravity CG will be located in a plum line below the point of support of the tipsy base 12 on its support surface. The center of gravity CGB of the body 10 is located to one side of the support point (FIG. 2), and hence the weight of body 10 by itself tends to rotate the body 10 such direction. However, actual rotation is prevented by a counter-rotational effect of the weight W, the center of gravity CGW of which is located on the opposite side of the balanced portion. Accordingly, the body 10 sits balanced on its support rather than falling.

In FIG. 2 the appendage 14 is shown to be in a forwardly leaning position designated A. The center of gravity CGW of the weight means is located forwardly of the support point, the center of gravity CGB of the body 10 is located rearwardly of such support point, and the body 10 is balanced in a substantially upright position. FIG. 3 shows what happens when the appendage 14 is swung rearwardly from position A to position B. If the body 10 were to be hand held or otherwise restrained in the position in which it occupies in FIG. 2, while the appendage 14 is moved from position A to position B, the weight means comprising connector rod 42 and end weights W would swing forwardly (because of its rigid connection to appendage 14) to a new position wherein its center of gravity would occupy position CGW', and the center of gravity of the entire device would be moved forwardly to new position CG' (FIG. 2). Then, if the restraining force were to be removed from body 10, the weight means would swing back towards the support 16 until the center of gravity CG is again located in a plum line below the support point, i.e. the device would seek a new position of static balance. Thus, it will be apparent that as the appendage 14 is moved slowly by the motorized drive means (motor M, crank 38, lever 22, 26, 32, 34 and fulcrum means 28, 30) there is also a slow continuous movement of the body 10, because the device is continuously seeking a position of equilibrium or static balance with its center of gravity CG in a plum line below support point.

FIG. 4 shows the attitude taken by the body 10 when the appendage 14 is swung forwardly of position A to position C. Referring again to FIG. 2, if the body 10 were again hand restrained in the upright position shown, and appendage 14 were to be moved in to position C, the center of gravity of the weight means would be moved to a new position CGW", and the center of gravity of the entire device would be moved to a new position CG". As will be apparent, the center of gravity CGB of the body 10, located above the support point, and the centers of gravity CGW of the weight means and CG of the entire device, both located below the support point, would all be located on the same side of the support point. Then, if the restraining force were to be removed from body 10, the entire device would quickly rotate clockwise, as illustrated, until the center of gravity CGW of the weight means is located on the opposite side of the support point, and the center of gravity CG of the entire device is again in a plum line below the point of support. Accordingly, as appendage 14 is moved slowly from point A to point C by the motorized drive means, and the centers of gravity CG and CGW tend to move toward the positions CG" and CGW", the body 10 moves slowly from its substantially upright position (FIG. 2) toward the rearwardly leaning position it is in when appendage 14 is in position C (FIG. 4).

Preferably each end weight W is a dry cell battery, and electrical conductor means is incorporated within the balancing rod 32, said conductor means serving to connect the two dry cell batteries and the electric motor together in series. A typical and therefore non-limitive electrical system is shown by FIG. 8. A first wire 44 may extend from one pole to the DC motor M through or along one arm of the connector rod 42 to the minus end of a first battery-weight. The connector rod 42 may be a piece of copper tubing, or the like, and may be used as a conductor extending from the plus end of said first battery-weight over to the minus end of the second battery-weight, with an insulative section 46 being located between the conductor rod 42 and the crank 38. Another wire 48 may then lead from the plus end of the second battery-weight back to the second pole of the DC motor M.

A switch 50 is shown in wire 44, but such switch could be dispensed with, and the circuit be open and closed merely by removal and replacement of one of the battery-weights.

As shown by FIG. 9, a spring clip type battery holder 52 may be secured to each end of the balancing rod 42, and the balancing rod 42 may be hollow, so that the wire 44 or 48 (44 being illustrated in FIG. 9), both of which have an insulative covering, may extend through such rod 42.

FIGS. 10 and 11 relate to a modified embodiment of the present invention, also shown in the form of an animal characterization, in which the appendage 14' is the head of the animal. In such embodiment the connector rod 42 is shown to be rigidly attached to the animals nose at point 54. The head 14' and the motorized drive means for same are adapted to provide an orbital movement of point 54, and hence of the weight means (i.e., connector rod 42 and end weight W), relative to the balance point where tipsy base 12' rests on the support surface of support members 16.

By way of typical and therefore nonlimitive example, the upper end portion of the body proper has the characteristics of a sphere, and the lower portion of appendage 14' is a socket with an interior spherical surface of complementary curvature. At quadrant locations, horizontal slots 56 may be provided in the upper end portion of the body proper, and vertical slots 58 may be formed in socket member. A pin 60 may extend through each pair of slots 56, 58 and serve to locate the socket member relative to the body proper, while permitting a universal movement of the head. A cylindrical ring 62 forms the neck of the animal, and a track 64 is located inside of, and is connected to, the ring 62.

The motorized drive means is illustrated to comprise an electric motor M having an upstanding output shaft 66 connected to a wheel carrier 68. The wheel carrier 68 includes a forked portion on which a pair of V-grooved wheels 70, 72 were rotatably supported. As best shown by FIG. 2, the track 64 has upper and lower V edges conforming to the periphery of the wheels 70, 72. The wheel 70 rides along the upper edges of the track 64, and the wheel 72 rides along the lower edge of the track 64. In the illustrated embodiment the distance from the top of motor M up to the vertical center of the space between wheels 70, 72 for the track 64 is greater than the distance from the top of the motor M up to the vertical center of the track 64 when said track 64 is exactly horizontal and the track 64 is exactly vertical.

As shown by FIG. 11, the portion of track 64 between the roller 70, 72 is lifted, causing the head assembly 14' to be tilted. As shaft 64 rotates, the position of wheels 70, 72 is always changing, and with them the high point of the track 64 changes. The slots 56, 58 prevent the head assembly 14' from rotating relative to the body proper. Instead, the head assembly 14' undergoes an orbital movement, and the weight means orbits with it. As the weight means moves its center of gravity it is continuously changing position with respect to the balance point, resulting in a continual changing attitude of the balancing device along an orbital path. In this embodiment of the invention, the center of gravity of the weight means shifts laterally as well as forwardly and rearwardly relative to the balance point resulting in the balancing device also moving laterally in seek of a new position of static equilibrium.

In a further form of the invention, the head assembly may include a ball at or slightly below the neck location of the figure, and the body proper may include a socket engaging such ball. A short stem may then extend downwardly from the ball and be universally interconnected at its lower end to the end of a member extending laterally outwardly from a vertical shaft like shaft 66. Rotation of the vertical shaft will produce an orbital movement of the lower end of the stem, and in turn an orbital movement of the animals head.

Of course, a dynamic balancing device of the present invention is not limited to an animal characterization. It may be a type of plant life, a vehicle, building structure, etc. It may include a lower portion of any form, but provided with a tipsy base, and an upper portion to which the weight means is attached, and which is adapted for movement relative to the lower portion. In still a further embodiment of the invention, the device may include a hollow body with no movable appendage, with a rounded bottom providing a tipsy base, with weight means at said bottom to balance the device on its tipsy base, and with another weight means inside the body, above the bottom, and motorized drive means for rotating or otherwise moving the weight means sideways relative to the tipsy base.

From the foregoing, further variations, adaptations, modifications and characteristic features can be evolved by those skilled in the art to which the invention is addressed, within the scope of the following claims.

What is claimed is:

1. A dynamic balancing device comprising a body having a first portion with a tipsy base, a second portion secured to said first portion for movement relative thereto, weight means disposed below said tipsy base and of a magnitude sufficient to put the center of gravity of the entire balancing device below the level of the tipsy base, means connecting said weight means with said second portion, and a motorized drive means inside said body operable to move the said second portion relative to the said first portion, and hence the center of gravity of the balancing device relative to the location of contact of the tipsy base with its support, an amount sufficient to cause a noticeable change in the attitude of said body as the device seeks a new position of equilibrium, with said motorized drive means including a rotating shaft motor, first class lever means housed within said first portion and having a first part integral with the said second portion of the body and a second part disposed inside the said first portion of the body, fulcrum means supporting said lever means for pivotal movement about where said first and second lever parts are joined, a crank connected to said motor for rotation thereby, with said motor and said crank being housed within said first portion below the fulcrum and contiguous the second lever part, with the rotary axis of the crank being parallel to the pivotal axis of said lever means, with said crank including a crankpin offset from the rotary axis of said crank, with said second lever part including a longitudinal crankpin guide engaging said crankpin, with said crankpin exerting a back and forth lateral push on said second lever part as the crank rotates, and with the first lever part, and the second portion of said body and the said weight means connected thereto, being swung back and forth about the fulcrum and relative to said first portion of the body in response to said movement of the second lever part.

2. A self contained dynamic balancing device comprising a body having a first portion with a tipsy base, a second portion secured to said first portion for movement relative thereto, weight means disposed below said tipsy base and of a magnitude sufficient to put the center of gravity of the entire balancing device below the level of the tipsy base, means connecting said weight means with said second portion, and motorized drive means inside said body operable to move the said second portion relative to the said first portion, and hence the center of gravity of the balancing device relative to the location of contact of the tipsy base with its support, an amount sufficient to cause a noticeable change in the attitude of said body as the device seeks a new position of equilibrium, said weight means including at least one dry cell battery, said motorized drive means including an electric motor, and said means connecting the weight means with said second portion including electrical conductor means for electrically connecting the dry cell battery with the electric motor.

3. A balancing device according to claim 2, wherein said body is an animal characterization, said first portion includes a foot, the bottom of which forms the tipsy base, and said second portion constitutes an upper appendage of the animal.

4. A dynamic balancing device according to claim 2, wherein the said means connecting the weight means with the second portion comprises an arcuate balancing rod of substantial length and curvature, the said second portion is rigidly affixed to a midportion of said rod, the said weight means comprises a separate weight affixed to each end of the rod, below the level of the tipsy base, each weight means comprises a separate dry cell battery, and the said electrical means is incorporated within the balancing rod and serves to connect the two dry cell batteries and the electric motor together in series.

5. A dynamic balancing device according to claim 4, wherein said motorized drive means further includes lever means having a first part integral with the said second portion of the body and a second part disposed inside the said first portion of the body, fulcrum means supporting said lever means for pivotal movement about where said first and second lever parts are joined, and a crank connected to said electric motor for rotation thereby, with said electric motor and said crank being located inside said body below the fulcrum and contiguous the second lever part, with said crank including a crankpin offset from the rotary axis of said crank, and with said second lever part including a longitudinal crankpin guide engaging said crankpin, whereby said crankpin exerts a back and forth lateral push on said second lever part as the crank rotates, and in response to said movement of the second lever part the first lever part, and the second portion of the body and the said weight means connected thereto, are swung back and forth about the fulcrum and relative to said first portion of the body.

References Cited
UNITED STATES PATENTS

| | | | |
|---|---|---|---|
| 1,127,388 | 2/1915 | Banovitch | 46—131 |
| 1,607,533 | 11/1926 | Hance | 46—131 |
| 1,616,579 | 2/1927 | Kadowaki | 46—131 X |
| 2,396,382 | 3/1946 | Maibaum | 46—119 X |
| 2,918,752 | 12/1959 | Higgins | 46—131 |
| 3,029,552 | 4/1962 | Katz | 40—1063 X |
| 3,160,981 | 12/1964 | Higgins | 46—131 |

LOUIS G. MANCENE, *Primary Examiner.*

S. NATTER, *Assistant Examiner.*